United States Patent

Liu

(10) Patent No.: US 12,506,929 B2
(45) Date of Patent: Dec. 23, 2025

(54) SCRAMBLING DEVICE AND SCRAMBLING METHOD

(71) Applicant: TCL China Star Optoelectronics Technology Co., Ltd., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 572 days.

(21) Appl. No.: 17/600,223

(22) PCT Filed: Sep. 7, 2021

(86) PCT No.: PCT/CN2021/116888
§ 371 (c)(1),
(2) Date: Nov. 29, 2023

(87) PCT Pub. No.: WO2022/193570
PCT Pub. Date: Sep. 22, 2022

(65) Prior Publication Data
US 2024/0089532 A1    Mar. 14, 2024

(30) Foreign Application Priority Data
Mar. 17, 2021 (CN) .......................... 202110286836.2

(51) Int. Cl.
*H04N 21/4408* (2011.01)
*H04N 7/16* (2011.01)
*H04N 7/167* (2011.01)

(52) U.S. Cl.
CPC ......... *H04N 21/4408* (2013.01); *H04N 7/163* (2013.01); *H04N 7/1675* (2013.01)

(58) Field of Classification Search
CPC .. H04N 21/4408; H04N 7/163; H04N 7/1675; H04N 21/44
See application file for complete search history.

(56) References Cited

U.S. PATENT DOCUMENTS

| | | | |
|---|---|---|---|
| 3,784,743 A | 1/1974 | Schroeder | |
| 5,887,061 A * | 3/1999 | Sato | ..................... H04N 19/176 375/E7.176 |
| 2003/0005436 A1 | 1/2003 | Naganuma | |
| 2011/0035645 A1 | 2/2011 | Yang | |
| 2013/0142288 A1* | 6/2013 | Dinan | ................. H04J 11/0076 375/340 |
| 2015/0036756 A1* | 2/2015 | Choi | ..................... H04N 19/88 375/240.26 |

(Continued)

FOREIGN PATENT DOCUMENTS

| | | |
|---|---|---|
| CN | 102932100 | 2/2013 |
| CN | 104065968 | 9/2014 |

(Continued)

*Primary Examiner* — Mohammad W Reza

(57) ABSTRACT

The present application provides a scrambling device and a scrambling method. The scrambling device includes a data acquisition module, a judging module, a first scrambling module, a second scrambling module and an output module. The judging module judges data signals and transmits different data signals to the corresponding scrambling modules, so as to scramble the data signals, and finally obtain required output signals, thereby effectively increasing a scrambling rate of the scrambling device.

13 Claims, 2 Drawing Sheets

(56) References Cited

U.S. PATENT DOCUMENTS

2019/0385667 A1* 12/2019 Morohashi ........ G11C 11/40611

FOREIGN PATENT DOCUMENTS

| | | |
|---|---|---|
| CN | 205142235 | 4/2016 |
| CN | 109993005 | 7/2019 |
| CN | 110138695 | 8/2019 |
| CN | 111954036 | 11/2020 |
| CN | 113115113 | 7/2021 |
| JP | 03-273725 | 12/1991 |
| JP | 2014-192886 | 10/2014 |

* cited by examiner

SCRAMBLING DEVICE AND SCRAMBLING METHOD

RELATED APPLICATIONS

This application is a National Phase of PCT Patent Application No. PCT/CN2021/116888 having International filing date of Sep. 7, 2021, which claims the benefit of priority of Chinese Patent Application No. 202110286836.2 filed on Mar. 17, 2021. The contents of the above applications are all incorporated by reference as if fully set forth herein in their entirety.

FIELD AND BACKGROUND OF THE INVENTION

The present application relates to data signal control technologies for display panels, and more particularly, to a scrambling device and a scrambling method.

With the continuous improvement of display panel display technologies, people have also imposed higher requirements for quality and effects of a display image of a display panel.

To obtain a display device with better display quality, it is required to better process a data signal. During transmission of digital signals, a scrambler is usually added at a transmitting end, and data signals are optimized through the scrambler. The scrambler functions to change statistical characteristics of the digital signals to make the digital signals become an approximate white noise sequence. The frequency of the white noise sequence is relatively scattered, which is equivalent to that energy of the signals is relatively scattered, so as to achieve the purpose of reducing electromagnetic interference. In addition, a scrambling code sequence generated by the scrambler has a certain cycle period, and sequences are connected in sequence to form a long-period sequence, thereby effectively improving quality of signal data processing. However, when a data signal is processed in the prior art, the following problems often occur: data signal processing efficiency is low, and data with a relatively long scrambling code sequence cannot be processed effectively; moreover, the data signal is susceptible to external electromagnetic interference during processing; therefore, data scrambling is not ideal, resulting in poor image display quality.

SUMMARY OF THE INVENTION

Technical Problem

In conclusion, in an existing digital signal scrambling technology, when a digital signal is scrambled, data with a relatively long scrambling code sequence cannot be effectively processed, and the data signal is susceptible to external electromagnetic interference during processing; therefore, the data scrambling effect is not ideal, resulting in problems such as poor display quality of a display device during image display.

Technical Solution

Embodiments of the present application provide a scrambling device and a scrambling method, so as to effectively solve problems that when a data signal is processed, data with a relatively long scrambling code sequence cannot be effectively processed, and the data signal is susceptible to external electromagnetic interference during processing; therefore, the data scrambling effect is not ideal, resulting in poor display quality of a display device during image display.

To solve the above-mentioned technical problems, technical methods provided by the embodiments of the present application are as follows:

According to a first aspect of the embodiments of the present application, a scrambling device is provided, including:

a data acquisition module, configured to acquire an original data signal of a display image;

a judging module, configured to judge the original data signal, output a first control signal when the original data signal is a high-level signal, and output a second control signal when the original data signal is a low-level signal, where the number of bits of the first control signal is different from the number of bits of the second control signal;

a first scrambling module, configured to receive the first control signal and scramble the first control signal to obtain a first scrambled data signal;

a second scrambling module, configured to receive the second control signal and scramble the second control signal to obtain a second scrambled data signal; and an output module, configured to receive and output the first scrambled data signal or the second scrambled data signal.

According to an embodiment of the present application, the judging module includes a sampling unit and a control unit, the sampling unit is connected to the control unit, one end of the sampling unit is connected to an output end of the data acquisition module, and the other end of the sampling unit is connected to the control unit.

According to an embodiment of the present application, when the original data signal is at a high level, the control unit is turned on, and an output signal of the judging module is transmitted to the first scrambling module; and when the original data signal is at a low level, the control unit is turned off, and the output signal of the judging module is transmitted to the second scrambling module.

According to an embodiment of the present application, the control unit is an inverted logic gate.

According to an embodiment of the present application, the first control signal and the second control signal each include a logic digital signal and an enable data signal.

According to an embodiment of the present application, the original data signal has 8 bits.

According to an embodiment of the present application, the first control signal and the second control signal are mutually inverted data values.

According to a second aspect of the embodiments of the present application, a scrambling device is provided, including:

a data acquisition module, configured to acquire an original data signal of a display image;

a judging module, configured to judge the original data signal, output a first control signal when the original data signal is a high-level signal, and output a second control signal when the original data signal is a low-level signal;

a first scrambling module, configured to receive the first control signal and scramble the first control signal to obtain a first scrambled data signal;

a second scrambling module, configured to receive the second control signal and scramble the second control signal to obtain a second scrambled data signal; and an output module, configured to receive and output the first scrambled data signal or the second scrambled data signal.

According to an embodiment of the present application, the judging module includes a sampling unit and a control unit, the sampling unit is connected to the control unit, one end of the sampling unit is connected to an output end of the data acquisition module, and the other end of the sampling unit is connected to the control unit.

According to an embodiment of the present application, when the original data signal is at a high level, the control unit is turned on, and an output signal of the judging module is transmitted to the first scrambling module; and when the original data signal is at a low level, the control unit is turned off, and the output signal of the judging module is transmitted to the second scrambling module.

According to an embodiment of the present application, the control unit is an inverted logic gate.

According to an embodiment of the present application, the first control signal and the second control signal each include a logic digital signal and an enable data signal.

According to an embodiment of the present application, the original data signal has 8 bits.

According to an embodiment of the present application, the first control signal and the second control signal are mutually inverted data values.

According to a second aspect of the embodiments of the present application, a scrambling method is further provided, including the following steps:

acquiring an original data signal of a display image;

judging the original data signal, outputting a first control signal when the original data signal is a high-level signal, and outputting a second control signal when the original data signal is a low-level signal;

receiving the first control signal and the second control signal, and scrambling the first control signal and the second control signal, where the first control signal is scrambled to obtain a first scrambled data signal, and when the second control signal is scrambled, the second control signal is inverted and then scrambled to obtain a second scrambled data signal; and receiving and outputting the first scrambled data signal and the second scrambled data signal.

According to an embodiment of the present application, the first scrambling module scrambles the first control signal, and the second scrambling module scrambles the second control signal.

According to an embodiment of the present application, the first control signal includes N data bit streams, and the second control signal includes N data bit streams;

in the case of N=1, when the $i^{th}$ data bit stream arrives, the first control signal is a high-level signal, and after the first control signal is processed by the first scrambling module, the $i^{th}$ data bit stream is obtained; when the $(i+1)^{th}$ data bit stream arrives, the second control signal is a low-level signal, the second control signal is processed by the second scrambling module to obtain the $(i+1)^{th}$ data bit stream, and i is an integer greater than or equal to 1; and in the case of N=2, when the $i^{th}$ and $(i+1)^{th}$ data bit streams arrive, the first control signal is a high-level signal, and after the first control signal is processed by the first scrambling module, the $i^{th}$ data bit stream is obtained; when the $(i+2)^{th}$ and $(i+3)^{th}$ data bit streams arrive, the second control signal is a low-level signal, the second control signal is processed by the second scrambling module to obtain the $(i+2)^{th}$ and $(i+3)^{th}$ data bit streams, and i is an integer greater than or equal to 1.

According to an embodiment of the present application, the number of bits of the first control signal is different from the number of bits of the second control signal.

According to an embodiment of the present application, the first control signal and the second control signal are mutually inverted data values.

According to an embodiment of the present application, the original data signal has 8 bits.

Embodiments of the present application provide a scrambling device and a scrambling method. A data acquisition module acquires an original data signal of a display image; a judging module receives and judges the original data signal, specifically judges a high/low level of the original data signal, outputs a first control signal and transmits the first control signal to a first scrambling module when the original data signal is a high-level signal, and outputs a second control signal and inverts the second control signal and transmits the inverted second control signal to a second scrambling module when the original data signal is a low-level signal. Through the above-mentioned processing and control method, different digital signals are effectively scrambled, and the impact of external electromagnetic interference during processing is reduced, so that the data scrambling effect is better, and finally signal transmission quality and image display quality are effectively improved.

BRIEF DESCRIPTION OF THE SEVERAL VIEWS OF THE DRAWINGS

The following detailed description of the specific implementations of the present application with reference to accompanying drawings makes the technical solutions and other beneficial effects of the present application more apparent.

DESCRIPTION OF SPECIFIC EMBODIMENTS OF THE INVENTION

The technical solutions in the embodiments of the present application are clearly and completely described below with reference to the accompanying drawings in the embodiments of the present application. Apparently, the described embodiments are merely some rather than all of the embodiments of the present application. Based on the embodiments of the present application, all other embodiments obtained by a person skilled in the art without creative efforts shall fall within the protection scope of the present application.

In the description of the present application, it should be understood that the orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise" and "counterclockwise" is based on the orientation or positional relationship shown in the accompanying drawings, and is only for the convenience of describing the present application and simplifying the description, rather than indicating or implying that the apparatus or component referred to must have a specific orientation, be constructed and operated in a specific orientation, which therefore cannot be understood as a limitation to the present application. In addition, the terms "first" and "second" are used for description only, and cannot be understood as indicating or implying relative importance or implicitly indicating the number of indicated technical features. Therefore, the features defined with "first" and "second" may include one or more of the features explicitly or implicitly. In the description of the present application, "a plural of" means two or more, unless otherwise specifically defined.

With the continuous improvement of digital signal processing technologies, during transmission of digital signals, a scrambler is usually added at a transmitting end, and statistical characteristics of the digital signals are changed through scrambling, so that the digital signals become approximate white noise sequence signals. Embodiments of the present application provide a scrambling device and a scrambling method, which improve the scrambling performance and scrambling rate of digital signals, solve the problems that the scrambling effect is not ideal and a digital signal is susceptible to external electromagnetic interference during transmission of digital signal propagation, and effectively improve the performance of a system.

Figure 1:
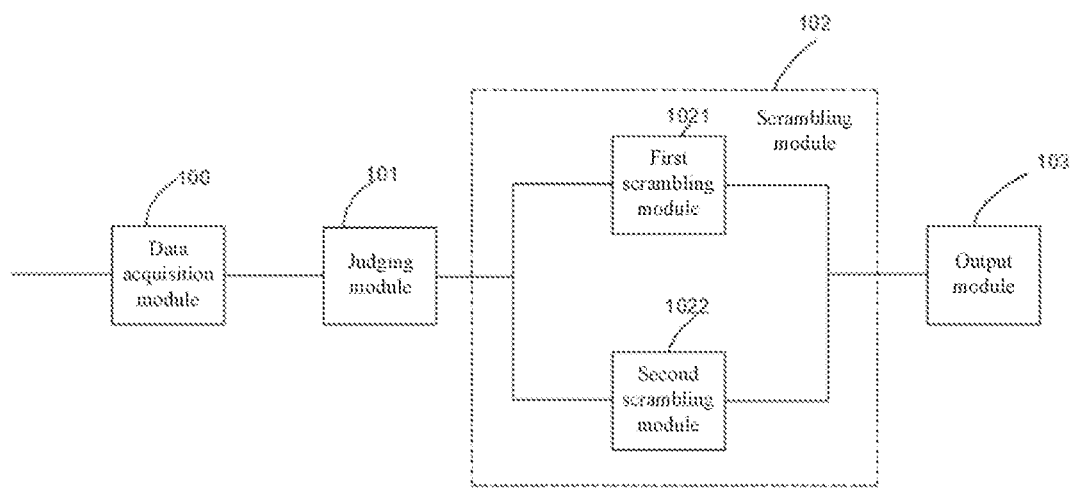
FIG. 1 is a schematic structural diagram of a scrambling device according to an embodiment of the present application.

As shown in FIG. 1, FIG. 1 is a schematic structural diagram of a scrambling device according to an embodiment of the present application. The scrambling device includes a data acquisition module 100, a judging module 101, scrambling modules 102 and an output module 103.

Specifically, the data acquisition module 100 is connected to the judging module 101, the judging module 101 is connected to the scrambling modules 102, and the output module 103 is connected to the scrambling modules 102 at the same time. In the embodiment of the present disclosure, the data acquisition module 100 is configured to acquire an original data signal of a display image to be transmitted, and transmit the original data signal to the judging module 101 after acquiring the original data signal of the display image; after receiving the transmitted original data signal, the judging module 101 judges a high/low level of the original data signal, and outputs different enable data signals based on the high/low level of the original data signal. In this case, the scrambling modules 102 receive the different enable data signals, and process the different enable data signals, to finally obtain and output different scrambled data signals.

In the embodiment of the present application, to effectively improve scrambling quality and scrambling effect of the data signal, when the scrambling module 102 is arranged, multiple scrambling unit modules may be arranged in the scrambling module 102, and the multiple scrambling unit modules may be connected in parallel with one another. In the embodiment of the present application, two-level cascaded scrambling unit modules are taken as an example for description, and other cascaded scrambling unit modules will not be described in detail.

Preferably, the scrambling module 102 in the embodiment of the present application includes a first scrambling module 1021 and a second scrambling module 1022. Input ends of both the first scrambling module 1021 and the second scrambling module 1022 are connected to the judging module 101, and output ends of both the first scrambling module 1021 and the second scrambling module 1022 are connected to the output module 103.

After acquiring the original data signal of the display image, the data acquisition module 100 transmits the original data signal to the judging module 101, and the judging module 101 judges the original data signal. Specifically, the acquired original data signal may include a data signal such as pixel data of the display image. After acquiring the pixel data, the data acquisition module 100 may convert the pixel data signal into a corresponding digital signal and transmit the digital signal.

The judging module 101 receives the original data signal output from the data acquisition module 100 and judges the data signal. Specifically, the judging module 101 outputs a first control signal when the original data signal is at a high level, and the judging module 101 outputs a second control signal when the original data signal is a low-level data signal.

Figure 2:
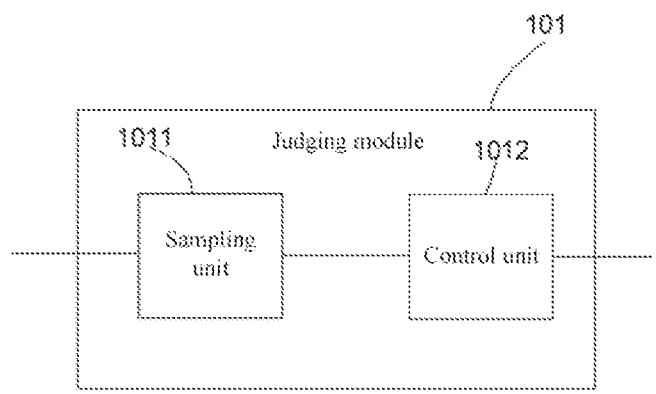
FIG. 2 is a schematic structural diagram of a judging module according to an embodiment of the present application.

Preferably, as shown in FIG. 2, FIG. 2 is a schematic structural diagram of a judging module according to an embodiment of the present application. The judging module 101 according to the embodiment of the present application further includes a sampling unit 1011 and a control unit 1012. One end of the sampling unit 1011 is connected to an input end of the judging module 101, the other end of the sampling unit 1011 is connected to one end of the control unit 1012, and the other end of the control unit 1012 is connected to an output end of the judging module 101.

When a data signal is judged, the sampling unit 1011 judges an original data signal, outputs a first control signal when the original data signal is a high-level data signal, and outputs a second control signal when the original data signal is a low-level data signal.

Further, the control unit 1012 receives different control signals transmitted by the sampling unit 1011. Specifically, when the signal received by the control unit 1012 is the first control signal, the control unit 1012 controls the first control signal and enables the first control signal to be transmitted to only the first scrambling module 1021, and when the signal received by the control unit 1012 is the second control signal, the second control signal is transmitted to only the second scrambling module 1022. Therefore, different original data signals can be transmitted to different scrambling modules respectively for scrambling to obtain better data signals.

Preferably, in the embodiment of the present application, when the control unit 1012 processes different control signals, when the control signal is the first control signal, the control unit 1012 is turned on, so that the first control signal is transmitted to the first scrambling module; and when the control signal is the second control signal, the control unit 1012 is turned off, so that the second control signal is transmitted to the second scrambling module.

In the embodiment of the present application, the control unit 1012 may be an inverted logic gate. Specifically, when the original data signal received by the judging module 101 is a low-level signal, the inverted logic gate performs inversion processing on the original data signal first to obtain a second control signal, and then transmits the second control signal to the second scrambling module 1022. Therefore, in the embodiment of the present application, the first control signal and the second control signal are mutually inverted data. In the embodiment of the present application, the first control signal and the second control signal each may include a logic digital signal and an enable data signal. The enable data signal is used to select a scrambling method for the data, and control the control unit 1012 to be turned on or off, thereby ensuring that different original data signals can be transmitted to the first scrambling module 1021 and the second scrambling module 1022, respectively. Therefore, under the premise of reducing signal energy and electromagnetic interference to the greatest extent, the scrambling rate is increased, the storage space of the device is reduced, and the scrambling quality is ensured.

Specifically, in the embodiment of the present application, the logic digital signals in the first control signal and the second control signal may be used to select scrambling modules corresponding to the input original data signal, i.e., different pixel data is transmitted to different scrambling modules, and it is finally ensured that the pixel data undergoes a corresponding scrambling operation to obtain the scrambled pixel data. In addition, the length of the high/low level of each of the enable data signals in the first control signal and the second control signal may be adjusted based on an actual scrambling process, where the number of bits of the first control signal may be the same as the number of bits of the second control signal. Preferably, during adjustment, one high level corresponds to N pixel data, and one low level corresponds to M pixel data, where M and N may be set arbitrarily, which is not specifically limited in this embodiment. Therefore, a generated scrambling code sequence is closer to the white noise sequence, and the energy of each frequency band is relatively balanced, so as to effectively improve the scrambling effect.

The original data signal may include multiple bits of data information. In the embodiment of the present application, when data information of one data bit stream is transmitted, the data information is 8-bit pixel data. When the bit stream of the pixel data is N=1, the period of the control signal is 2, i.e., the length of the high-level signal is 1 bit stream, and the length of the low-level signal is also 1 bit stream. When the $i^{th}$ data bit stream arrives, and the control signal in the judging module 101 judges that the pixel data is at a high level, the pixel data is transmitted to the first scrambling module 1021, and finally the scrambled $i^{th}$ data bit stream is obtained. When the $(i+1)^{th}$ data bit stream arrives, and the control signal in the judging module 101 judges that the pixel data is at a low level, the pixel data is transmitted to the second scrambling module 1022, finally the scrambled $(i+1)^{th}$ data bit stream is obtained, and i is an integer greater than 1.

When the bit stream of the pixel data is N=2, the period of the control signal is 4. That is, the length of the high-level signal is 2 bit streams, and the length of the low-level signal is 2 bit streams. When scrambling is performed, two pieces of high-level pixel data are transmitted to the first scrambling module 1021, and two pieces of low-level pixel data are transmitted to the second scrambling module 1022.

By analogy, that is, when the $i^{th}$ and $(i+1)^{th}$ data bit streams arrive, the pixel data signal is at a high level, and the signal is transmitted to the first scrambling module 1021 to obtain the scrambled $i^{th}$ and $(i+1)^{th}$ data bit stream; when the $(i+2)^{th}$ and $(i+3)^{th}$ data bit streams arrive, the pixel data signal is at a low level, and the signal is transmitted to the second scrambling module 1022 to obtain the scrambled $(i+2)^{th}$ and $(i+3)^{th}$ data bit streams.

Therefore, through the above-mentioned judging module 101 and scrambling module 102, different pieces of pixel data are transmitted to different scrambling modules, and the scrambled data is output. The scrambling method according to the embodiment of the present application effectively reduces the length of the scrambling code sequence. Therefore, the scrambling device according to the embodiment of the present application effectively ensures efficiency of data scrambling.

Figure 3:
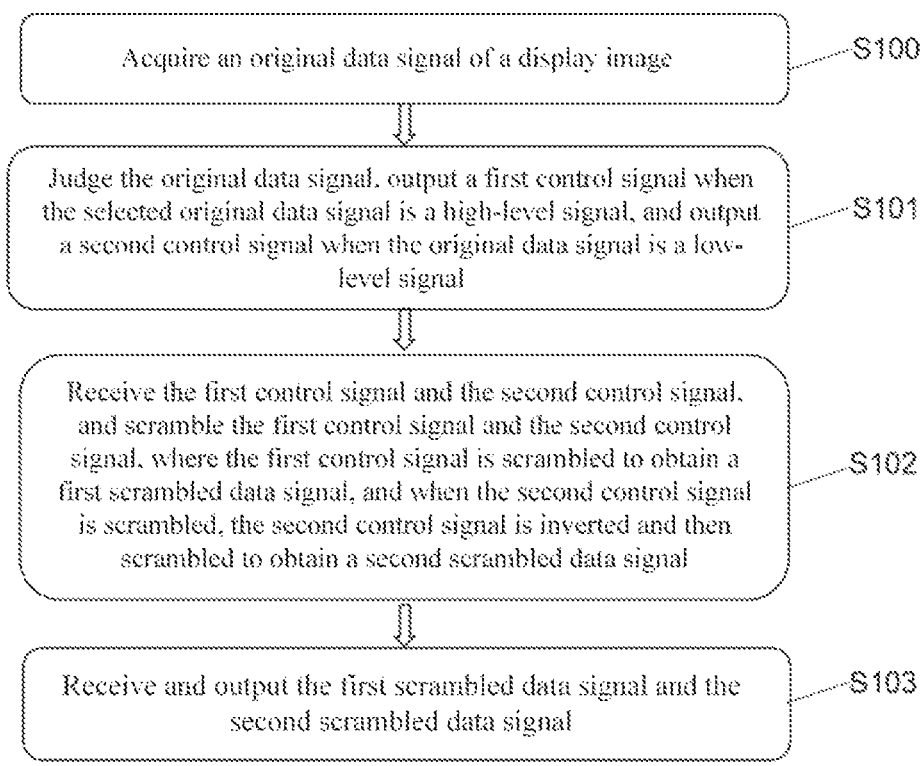
FIG. 3 illustrates a scrambling method according to an embodiment of the present application.

Further, as shown in FIG. 3, FIG. 3 illustrates a scrambling method according to an embodiment of the present application. The method includes the following steps.

S100: Acquire an original data signal of a display image.

S101: Judge the original data signal, output a first control signal when the original data signal is a high-level signal, and output a second control signal when the original data signal is a low-level signal.

In conjunction with the schematic structural diagram of the scrambling device in FIG. 1, in the embodiment of the present application, the data acquisition module 100 acquires the original data signal of the display image, and transmits the original data signal to the judging module 101; and the judging module 101 judges the data signal, outputs a first control signal when the original data signal is a high-level signal, and outputs a second control signal when the original data signal is a low-level signal.

S102: Receive the first control signal and the second control signal, and scramble the first control signal and the second control signal, where the first control signal is scrambled to obtain a first scrambled data signal, and when the second control signal is scrambled, the second control signal is inverted and then scrambled to obtain a second scrambled data signal.

Since the levels of the first control signal and the second control signal are different, in the scrambling process, different scrambling processing is performed on different data signals respectively.

The first control signal corresponding to the high-level pixel data is scrambled and output by the first scrambling module 1021, and the second control signal corresponding to the low-level pixel data is inverted and then scrambled and output by the second scrambling module 1022. Therefore, the pixel data is better scrambled.

S103: Receive and output the first scrambled data signal and the second scrambled data signal.

Further, an embodiment of the present application further provides a signal processing system. The signal processing system includes a storage medium and the scrambling device according to the embodiment of the present application. The signal processing system transmits data signals with different levels to different scrambling modules and scrambles the data signals accordingly, so that data signal scrambling efficiency and quality are effectively improved, and finally the display performance of a display panel is improved.

The scrambling device and the scrambling method according to embodiments of the present application are described in detail above. Specific examples are applied herein to illustrate the principle and implementations of the present application. The description of the above-mentioned embodiments is only used to help understand the technical solutions of the present application and the core idea thereof. A person of ordinary skill in the art should understand that he/she may still modify the technical solutions described in the foregoing embodiments, or equivalently replace some of the technical features therein. However, these modifications or replacements do not make the essence of the corresponding technical solutions depart from the scope of the technical solutions of each embodiment of the present application.

What is claimed is:

1. A scrambling device, comprising:
   a data acquisition module configured to acquire an original data signal of a display image;
   a judging module configured to judge the original data signal, to output a first control signal when the original data signal is a high-level signal, and to output a second control signal when the original data signal is a low-level signal, wherein a number of bits of the first control signal is different from a number of bits of the second control signal;

a first scrambling module configured to receive the first control signal and scramble the first control signal to obtain a first scrambled data signal;

a second scrambling module configured to receive the second control signal and scramble the second control signal to obtain a second scrambled data signal; and an output module configured to receive and output the first scrambled data signal or the second scrambled data signal;

wherein the first control signal and the second control signal are generated independently from each other.

2. The scrambling device according to claim 1, wherein the judging module comprises a sampling unit and a control unit, the sampling unit is connected to the control unit, one end of the sampling unit is connected to an output end of the data acquisition module, and the other end of the sampling unit is connected to the control unit.

3. The scrambling device according to claim 2, wherein when the original data signal is at a high level, the control unit is turned on, and an output signal of the judging module is transmitted to the first scrambling module; when the original data signal is at a low level, the control unit is turned off, and the output signal of the judging module is transmitted to the second scrambling module.

4. The scrambling device according to claim 2, wherein the control unit is an inverted logic gate.

5. The scrambling device according to claim 1, wherein the first control signal and the second control signal each comprise a logic digital signal and an enable data signal.

6. The scrambling device according to claim 3, wherein the original data signal has 8 bits.

7. The scrambling device according to claim 1, wherein the first control signal and the second control signal are mutually inverted data values.

8. A scrambling method, comprising the following steps:
acquiring an original data signal of a display image;
judging the original data signal, outputting a first control signal when the original data signal is a high-level signal, and outputting a second control signal when the original data signal is a low-level signal;
receiving the first control signal and the second control signal, and scrambling the first control signal and the second control signal, wherein the first control signal is scrambled to obtain a first scrambled data signal, and when the second control signal is scrambled, the second control signal is inverted and then scrambled to obtain a second scrambled data signal; and
receiving and outputting the first scrambled data signal and the second scrambled data signal;

wherein a number of bits of the first control signal is different from a number of bits of the second control signal;

wherein the first control signal and the second control signal are generated independently from each other.

9. The scrambling method according to claim 8, wherein the first scrambling module scrambles the first control signal, and the second scrambling module scrambles the second control signal.

10. The scrambling method according to claim 9, wherein the first control signal comprises N data bit streams, and the second control signal comprises N data bit streams;

in the case of N=1, when the ith data bit stream arrives, the first control signal is a high-level signal, and after the first control signal is processed by the first scrambling module, the ith data bit stream is obtained; when the (i+1)th data bit stream arrives, the second control signal is a low-level signal, the second control signal is processed by the second scrambling module to obtain the (i+1)th data bit stream, and i is an integer greater than or equal to 1; and in the case of N=2, when the ith and (i+1)th data bit streams arrive, the first control signal is a high-level signal, and after the first control signal is processed by the first scrambling module, the ith data bit stream is obtained; when the (i+2)th and (i+3)th data bit streams arrive, the second control signal is a low-level signal, the second control signal is processed by the second scrambling module to obtain the (i+2)th and (i+3)th data bit streams, and i is an integer greater than or equal to 1.

11. The scrambling method according to claim 8, wherein the first control signal and the second control signal each comprise a logic digital signal and an enable data signal.

12. The scrambling method according to claim 11, wherein the first control signal and the second control signal are mutually inverted data values.

13. The scrambling method according to claim 8, wherein the original data signal has 8 bits.

* * * * *